US012580254B2

(12) United States Patent
Liang et al.

(10) Patent No.: US 12,580,254 B2
(45) Date of Patent: Mar. 17, 2026

(54) ENERGY STORAGE APPARATUS AND ELECTRIC DEVICE

(71) Applicant: Hithium Tech HK Limited, Kowloon (HK)

(72) Inventors: Jinyun Liang, Shenzhen (CN); Feng Wang, Shenzhen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 0 days.

(21) Appl. No.: 18/389,101

(22) Filed: Nov. 13, 2023

(65) Prior Publication Data

US 2024/0274927 A1     Aug. 15, 2024

(30) Foreign Application Priority Data

Feb. 9, 2023     (CN) .......................... 202310091076.9

(51) Int. Cl.
H01M 50/103          (2021.01)
H01M 50/15          (2021.01)
(Continued)

(52) U.S. Cl.
CPC ........... H01M 50/15 (2021.01); H01M 50/16 (2021.01); H01M 50/533 (2021.01); H01M 50/557 (2021.01); H01M 50/583 (2021.01)

(58) Field of Classification Search
CPC .. H01M 50/15; H01M 50/176; H01M 50/531; H01M 50/533; H01M 50/55;
(Continued)

(56) References Cited

U.S. PATENT DOCUMENTS

2018/0375070 A1* 12/2018 Wakimoto ............ H01M 4/525
2020/0220134 A1    7/2020 Guen
2023/0031476 A1    2/2023 Lei

FOREIGN PATENT DOCUMENTS

CN          206134740 U     4/2017
CN          107248554 A     10/2017
(Continued)

OTHER PUBLICATIONS

Cai et al; "CN208127255U Top cap subassembly and secondary cell"; Machine translation of CN 208127255 U obtained from ESpacenet Patent Translate (Year: 2018).*
(Continued)

*Primary Examiner* — Allison Bourke
*Assistant Examiner* — Charlene Bermudez
(74) *Attorney, Agent, or Firm* — Hodgson Russ LLP

(57)          ABSTRACT

An energy storage apparatus and an electric device are provided in the disclosure. The energy storage apparatus includes an upper cover, a deformation member, a lower plastic member, a terminal post, a connector, and a tab. The lower plastic member is provided with a grid structure at one side of the lower plastic member where the through hole is defined at the fourth surface, and the grid structure separates the through hole into multiple sub-holes. The connector extends from the first connection portion that is connected to the terminal post to the second connection portion that is disposed at one side of the grid structure facing away from the deformation member, and an orthographic projection of the connector on the fourth surface of the lower plastic member covers at least part of the multiple sub-holes.

15 Claims, 12 Drawing Sheets

(51) Int. Cl.

| | |
|---|---|
| *H01M 50/16* | (2021.01) |
| *H01M 50/176* | (2021.01) |
| *H01M 50/533* | (2021.01) |
| *H01M 50/55* | (2021.01) |
| *H01M 50/557* | (2021.01) |
| *H01M 50/566* | (2021.01) |
| *H01M 50/583* | (2021.01) |

(58) Field of Classification Search
CPC ............. H01M 50/553; H01M 50/561; H01M 50/555; H01M 50/557; H01M 50/103
See application file for complete search history.

(56) References Cited

FOREIGN PATENT DOCUMENTS

| | | | | |
|---|---|---|---|---|
| CN | 206610838 | U | | 11/2017 |
| CN | 207183330 | U | | 4/2018 |
| CN | 207183331 | U | | 4/2018 |
| CN | 108428820 | A | | 8/2018 |
| CN | 208127255 | U | * | 11/2018 |
| CN | 209312816 | U | | 8/2019 |
| CN | 212874612 | U | | 4/2021 |
| CN | 212934729 | U | | 4/2021 |
| CN | 213401338 | U | | 6/2021 |
| CN | 214706180 | U | | 11/2021 |
| CN | 216563371 | U | | 5/2022 |
| CN | 216597780 | U | | 5/2022 |
| CN | 115441106 | A | | 12/2022 |
| CN | 218123656 | U | | 12/2022 |
| CN | 116014319 | A | | 4/2023 |
| WO | 2019174089 | A1 | | 9/2019 |

OTHER PUBLICATIONS

CNIPA, International Search Report and Written Opinion for International Application No. PCT/CN2023/075274, Jun. 23, 2023, 14 pages.
CNIPA, First Office Action for Chinese Patent Application No. 202310091076.9, Apr. 5, 2023, 24 pages.
CNIPA, Notice of Allowance for Chinese Patent Application No. 202310091076.9, Apr. 23, 2023, 9 pages.
EPO, Extended European Search Report issued in corresponding European Patent Application No. 23208750.2, Jul. 12, 2024, 8 pages.
EPO, Communication for EP Application No. 23208750.2, May 15, 2025.

* cited by examiner

ENERGY STORAGE APPARATUS AND ELECTRIC DEVICE

CROSS-REFERENCE TO RELATED APPLICATION(S)

This application claims priority under 35 U.S.C. § 119(a) to Chinese Patent Application No. 202310091076.9, filed Feb. 9, 2023, the entire disclosure of which is incorporated herein by reference.

TECHNICAL FIELD

This disclosure relates to the field of energy storage technology, and in particular, to an energy storage apparatus and an electric device.

BACKGROUND

In the related art, an end cover of an energy storage apparatus generally includes a lower plastic member and a deformation member, and the lower plastic member defines a through hole corresponding to the deformation member and a grid structure that is disposed at one side of the through hole and plays a protective role. However, grid strips of the grid structure are thin and thus have low structural strength, resulting in that the energy storage apparatus is prone to fracture failure caused by potential shaking and impact during daily use of the energy storage apparatus.

SUMMARY

In view of the above, an energy storage apparatus is provided in a first aspect of the disclosure and includes an upper cover, a deformation member, a lower plastic member, a terminal post, a connector, and a tab. The upper cover has a first surface and a second surface in a thickness direction, and defines a through hole and a first mounting hole that penetrate through the first surface and the second surface. The deformation member is fixed at the upper cover and extends into and cover the through hole. The lower plastic member has a third surface and a fourth surface in the thickness direction, and defines a through hole and a second mounting hole that penetrate through the third surface and the fourth surface. The lower plastic member is provided with a grid structure at one side of the lower plastic member where the through hole is defined at the fourth surface. The grid structure separates the through hole into multiple sub-holes. The terminal post has a flange portion and a cylinder portion, where the flange portion has a fifth surface and a sixth surface, and the cylinder portion is disposed at one side of the flange portion where the fifth surface is located. The cylinder portion of the terminal post extends through the second mounting hole of the lower plastic member and the first mounting hole of the upper cover. The fifth surface of the flange portion is positioned facing towards the fourth surface of the lower plastic member, the third surface of the lower plastic member is positioned facing towards the second surface of the upper cover, and the through hole of the lower plastic member is positioned facing towards the through hole of the upper cover. The connector has a first connection portion and a second connection portion at two opposite ends of the connector, where the first connection portion is connected to the sixth surface of the flange portion, the second connection portion is connected to the tab, and the second connection portion is positioned facing towards the grid structure. The connector extends from the first connection portion that is connected to the terminal post to the second connection portion that is disposed at one side of the grid structure facing away from the deformation member, and an orthographic projection of the connector on the fourth surface of the lower plastic member covers at least part of the multiple sub-holes.

An electric device is provided in a second aspect of the disclosure and includes the energy storage apparatus provided in the first aspect of the disclosure. The energy storage apparatus is configured to power the electric device.

BRIEF DESCRIPTION OF THE DRAWINGS

In order to describe technical solutions in implementations of the disclosure more clearly, accompanying drawings required for describing implementations of the disclosure are described below.

Reference signs: energy storage apparatus—1, end cover assembly—10, lower plastic member—11, through hole—110, sub-hole—110a, grid structure—111, grid hole—1110, grid strip—1111, first grid strip—1111a, second grid strip—1111b, recess—112, avoiding portion—113, third surface—114, fourth surface—115, second mounting hole—116, upper plastic member—12, upper cover—13, through hole—130, first surface—131, second surface—132, first mounting hole—133, deformation member—14, terminal post—15, flange portion—151, fifth surface—1511, sixth surface—1512, cylinder portion—152, connector—20, positive-electrode connector—20a, negative-electrode connector—20b, length direction—X, width direction—Y, thickness direction—Z, first connection portion—201, fuse portion—202, second connection portion—203, protrusion—2030, tab—30, cell—40.

DETAILED DESCRIPTION

The following are preferred implementations of the disclosure. It is noted that various improvements and modifications can be made without departing from principles of the disclosure by skilled person in the art, and these improvements and modifications are also considered as the protection scope of the disclosure.

Figure 1:
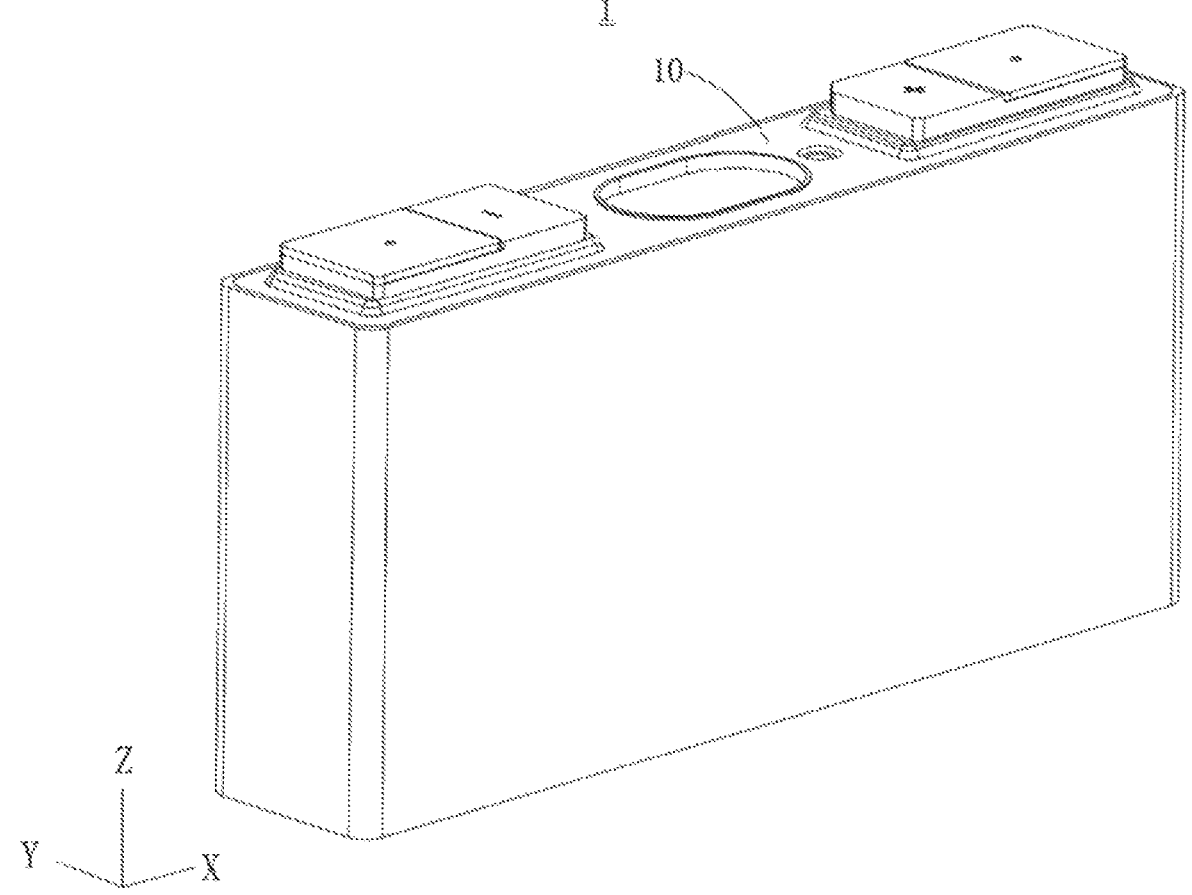
FIG. 1 is a schematic perspective structural view of an energy storage apparatus in an implementation of the disclosure.
Figure 2:
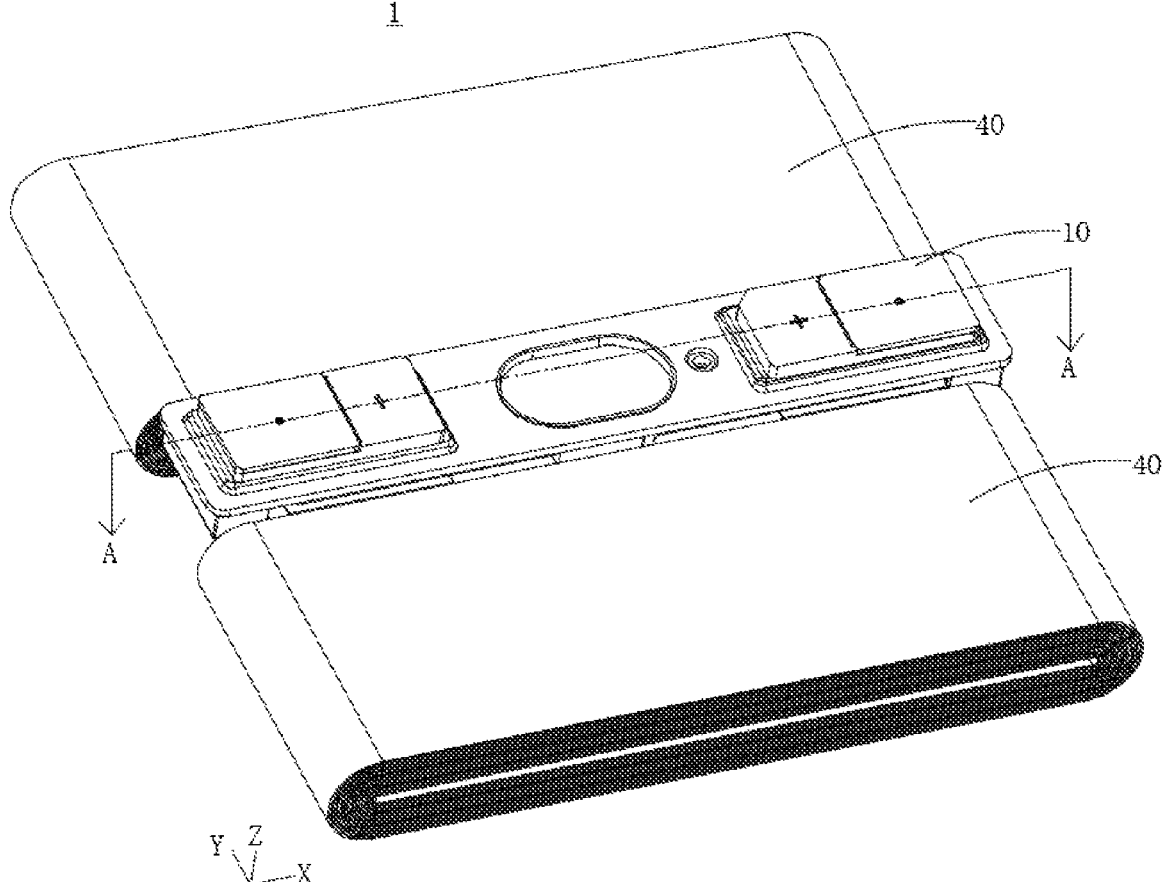
FIG. 2 is a schematic perspective structural view of the energy storage apparatus illustrated in FIG. 1 in a state where a housing of the energy storage apparatus is omitted and a cell is unfolded.
Figure 3:
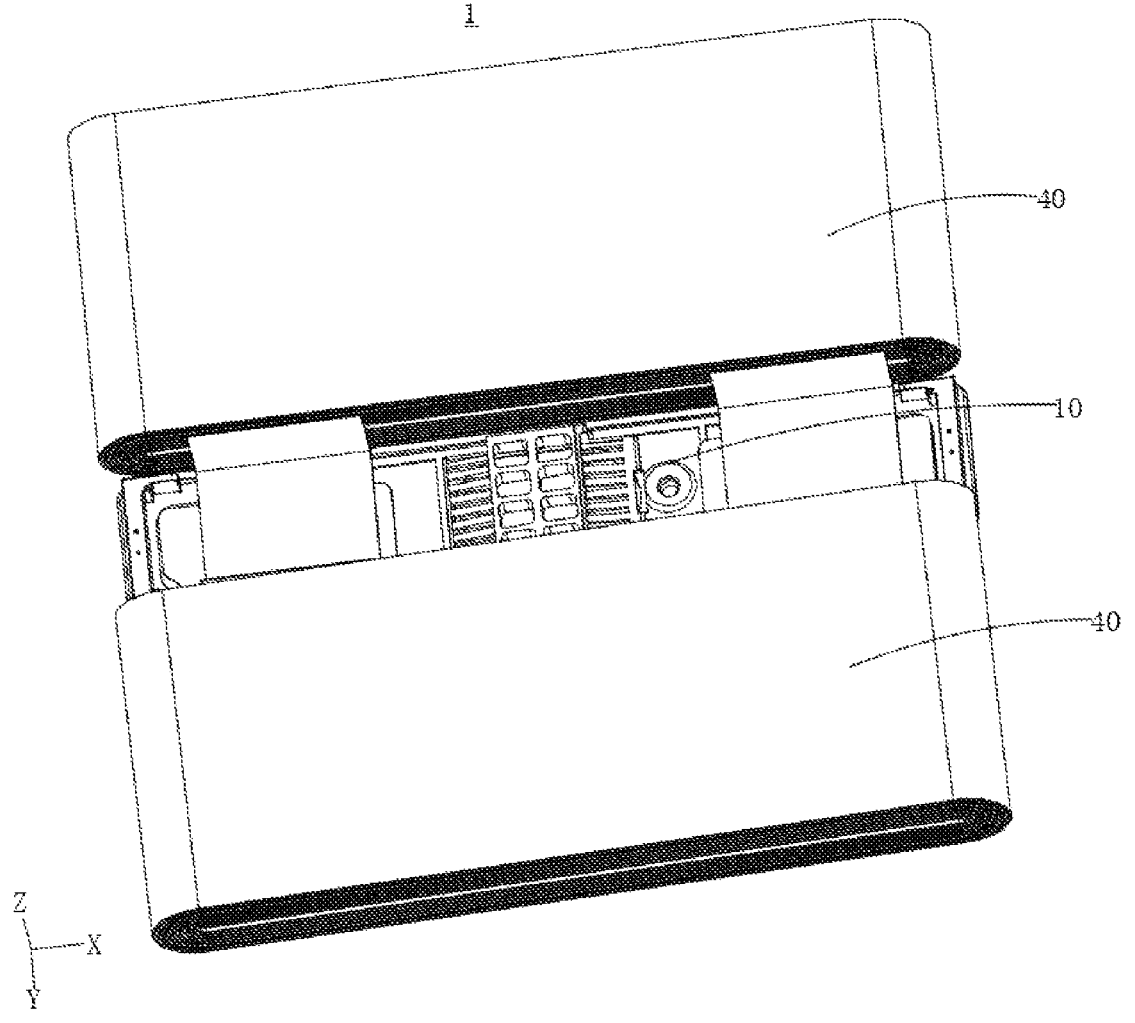
FIG. 3 is a schematic perspective structural view of the energy storage apparatus illustrated in FIG. 2 from another viewing angle.
Figure 4:
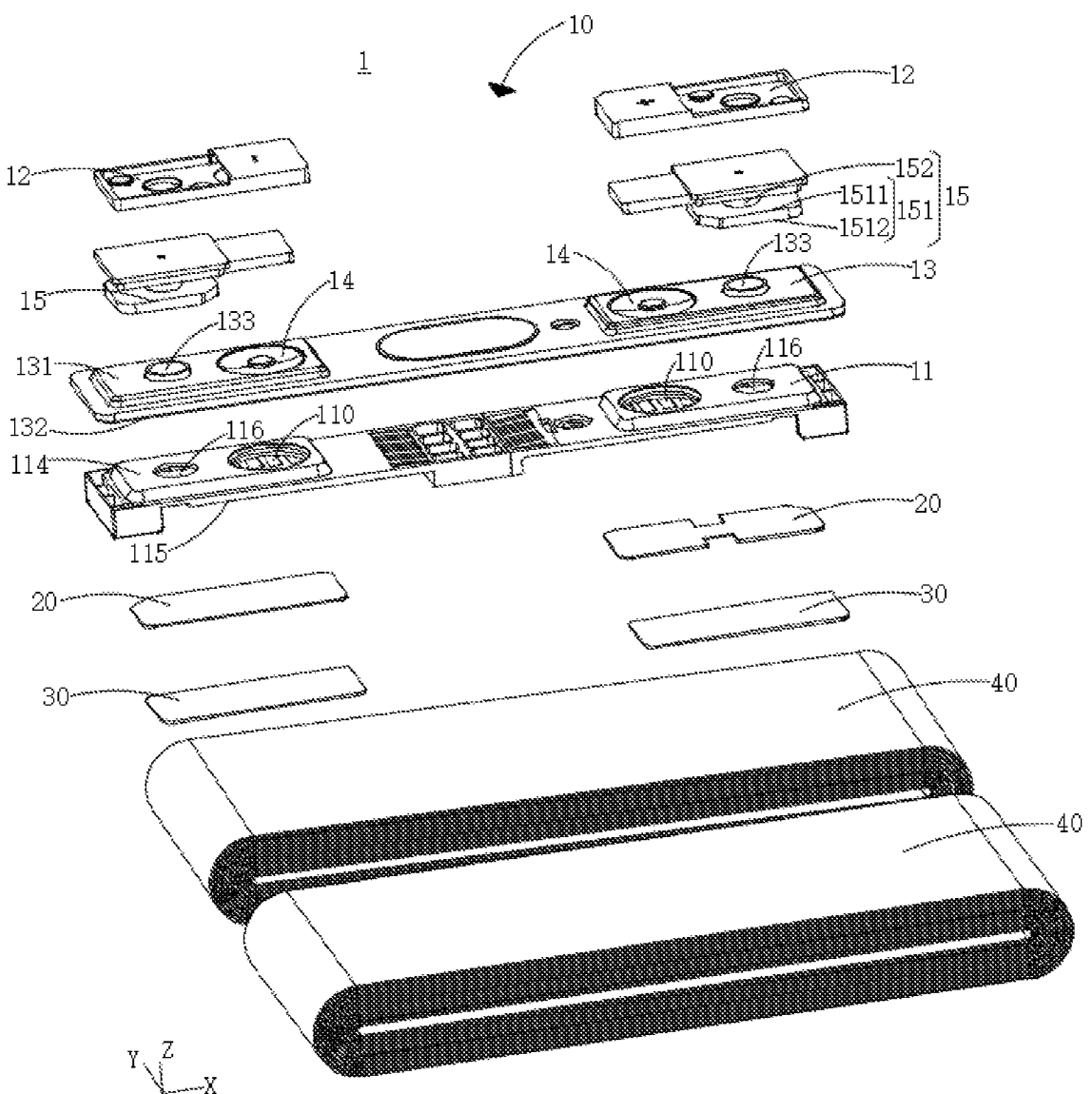
FIG. 4 is a partially exploded view of the energy storage apparatus illustrated in FIG. 2.
Figure 5:
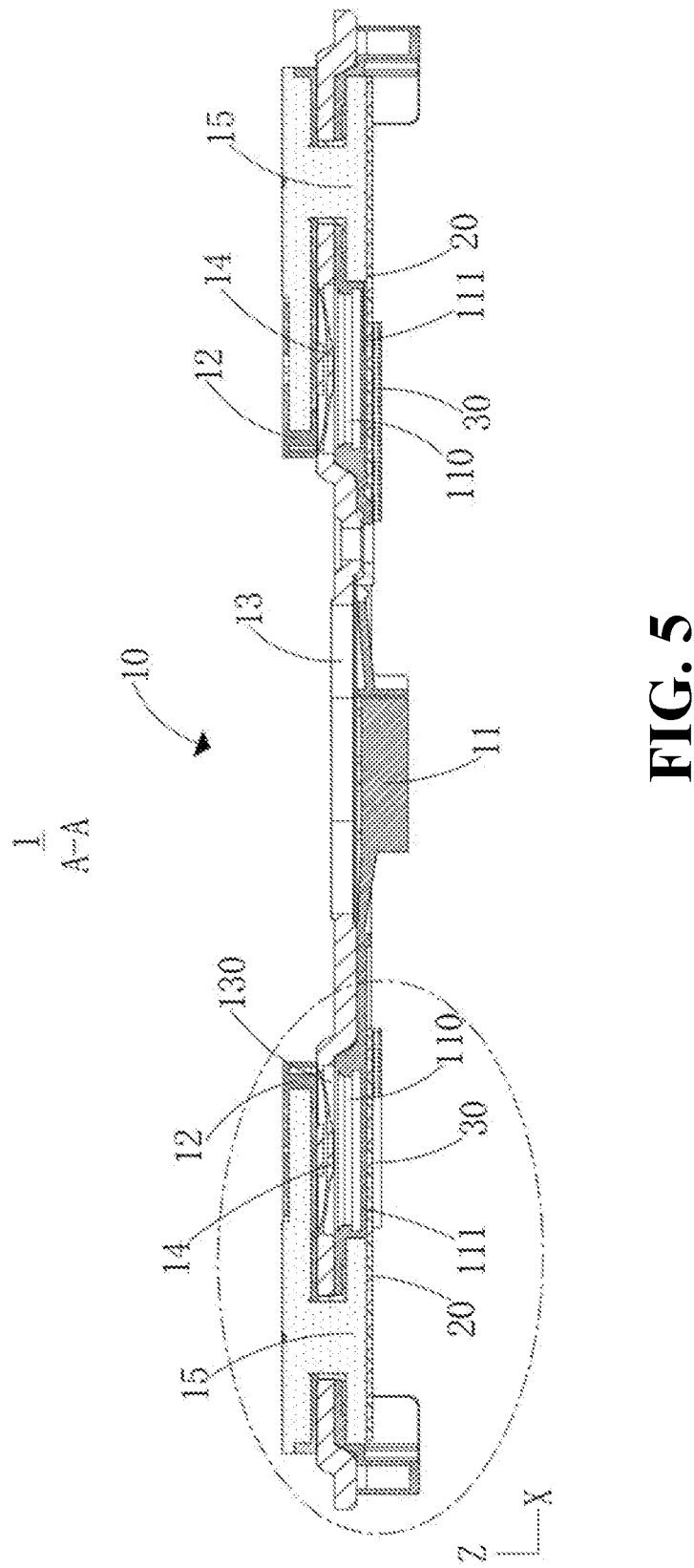
FIG. 5 is a schematic cross-sectional view of the energy storage apparatus illustrated in FIG. 2 along line A-A, where the cell is omitted.
Figure 6:
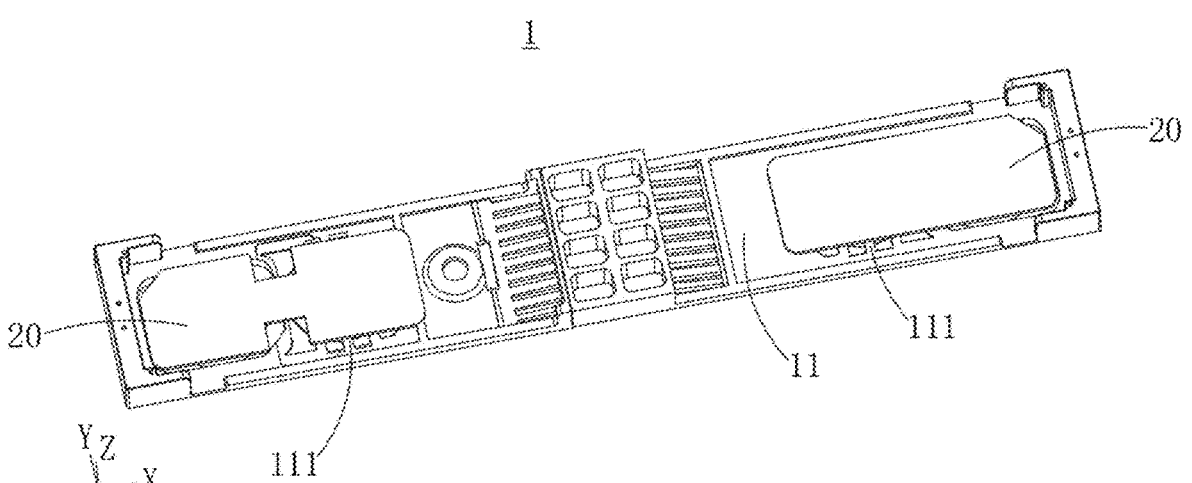
FIG. 6 is a schematic view illustrating assembly of a lower plastic member and a connector in an implementation of the disclosure.
Figure 7:
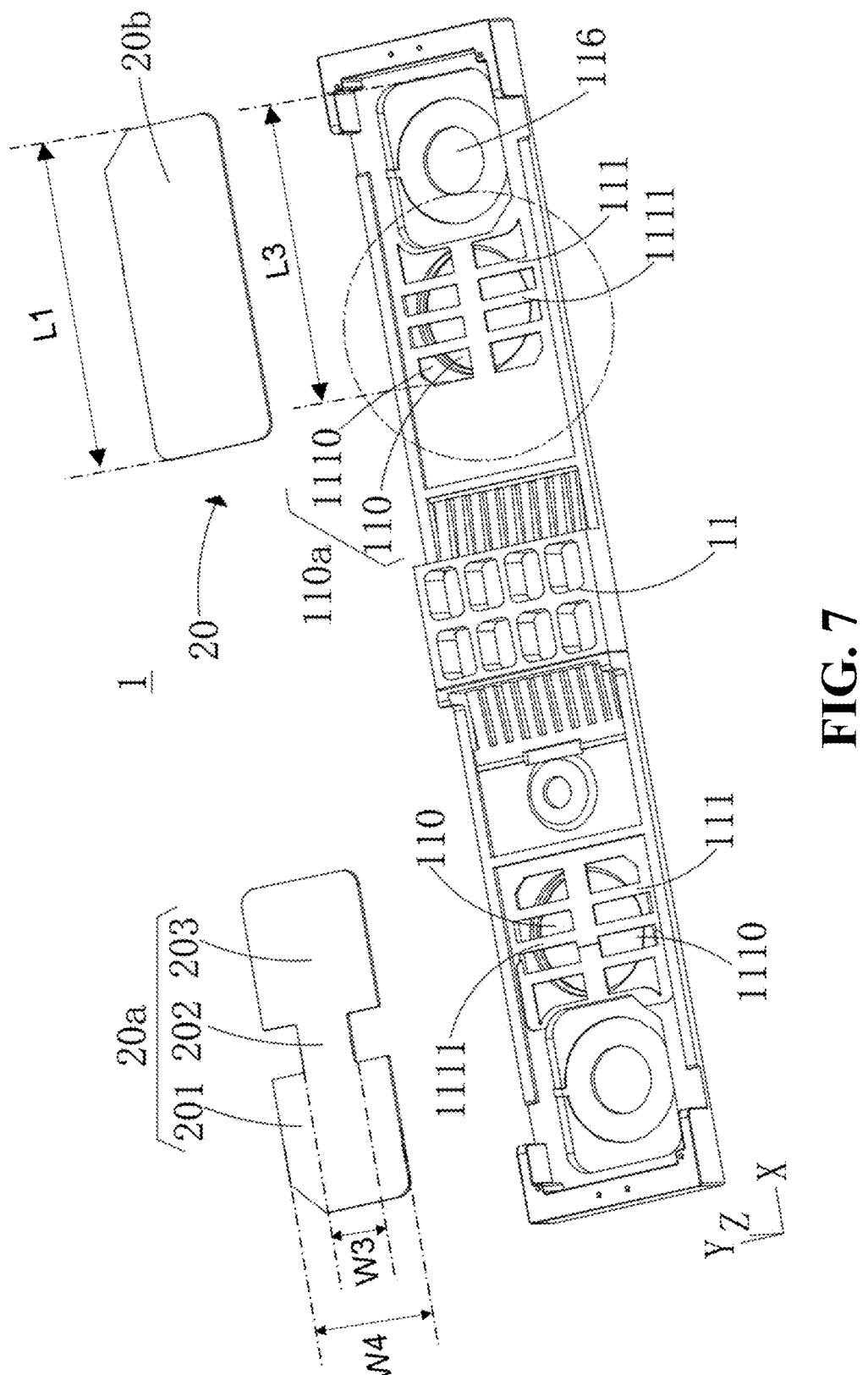
FIG. 7 is an exploded view of the lower plastic member and the connector illustrated in FIG. 6.

As illustrated in FIGS. 1 to 7, FIG. 1 is a schematic perspective structural view of an energy storage apparatus in an implementation of the disclosure. FIG. 2 is a schematic perspective structural view of the energy storage apparatus illustrated in FIG. 1 in a state where a housing of the energy storage apparatus is omitted and a cell is unfolded. FIG. 3 is a schematic perspective structural view of the energy storage apparatus illustrated in FIG. 2 from another viewing angle. FIG. 4 is a partially exploded view of the energy storage apparatus illustrated in FIG. 2. FIG. 5 is a schematic cross-sectional view of the energy storage apparatus illustrated in FIG. 2 along line A-A, where the cell is omitted. FIG. 6 is a schematic view illustrating assembly of a lower plastic member and a connector in an implementation of the disclosure. FIG. 7 is an exploded view of the lower plastic member and the connector illustrated in FIG. 6.

An energy storage apparatus 1 is provided in the implementation. The energy storage apparatus 1 includes a lower plastic member 11, an upper cover 13, a deformation member 14, a terminal post 15, a connector 20, and a tab 30. The upper cover 13 has a first surface 131 and a second surface 132 in a thickness direction Z, and defines a through hole 130 and a first mounting hole 133 that penetrate through the first surface 131 and the second surface 132.

The deformation member 14 is fixed at the upper cover 13 and extends into and covers the through hole 130.

The lower plastic member 11 has a third surface 114 and a fourth surface 115 in a thickness direction Z, and defines a through hole 110 and a second mounting hole 116 that penetrate through the third surface 114 and the fourth surface 115. The lower plastic member 11 is provided with a grid structure 111 at one side of the lower plastic member 11 where the through hole 110 is defined at the fourth surface (115), and the grid structure 111 separates the through hole 110 into multiple sub-holes 110a.

The terminal post 15 has a flange portion 151 and a cylinder portion 152. The flange portion 151 has a fifth surface 1511 and a sixth surface 1512. The cylinder portion 152 is disposed at one side of the flange portion 151 where the fifth surface 1511 is located.

The cylinder portion 152 of the terminal post 15 extends through the second mounting hole 116 of the lower plastic member 11 and the first mounting hole 133 of the upper cover 13. The fifth surface 1511 of the flange portion 151 is positioned facing towards the fourth surface 115 of the lower plastic member 11. The third surface 114 of the lower plastic member 11 is positioned facing towards the second surface 132 of the upper cover 13. The through hole 110 of the lower plastic member 11 is positioned facing towards the through hole 130 of the upper cover 13.

The connector 20 has a first connection portion 201 and a second connection portion 203 at two opposite ends of the connector 20. The first connection portion 201 is connected to the sixth surface 1512 of the flange portion 151. The second connection portion 203 is connected to the tab 30.

The second connection portion 203 is positioned facing towards the grid structure 111.

The connector 20 extends from the first connection portion 201 that is connected to the terminal post 15 to the second connection portion 203 that is disposed at one side of the grid structure 111 facing away from the deformation member 14. An orthographic projection of the connector 20 on the fourth surface 115 of the lower plastic member 11 covers at least part of the multiple sub-holes 110a.

The energy storage apparatus 1 provided in the implementations includes, but is not limited to, a battery cell, a battery module, a battery pack, a battery system, or the like. When the energy storage apparatus 1 is the battery cell, the energy storage apparatus 1 may be a square battery. The energy storage apparatus 1 mainly includes the lower plastic member 11 and the connector 20, but this does not mean that the energy storage apparatus 1 can only include the two structures. As illustrated in FIG. 4, the energy storage apparatus 1 may include an end cover assembly 10, the connector 20, the tab 30, a cell 40, or the like. The end cover assembly 10 includes an upper plastic member 12, the lower plastic member 11, the terminal post 15, the upper cover 13, the deformation member 14, or the like. The structure of the energy storage apparatus 1 is elaborated below.

The lower plastic member 11 may be configured for mounting of various components, and various structures may be disposed at the lower plastic member 11, to achieve a desired purpose. For example, the upper cover 13 may be disposed at one side of the lower plastic member 11. The upper cover 13 is disposed close to an outside. The second surface 132 of the upper cover 13 is positioned facing towards the third surface 114 of the lower plastic member 11, and the first surface 131 of the upper cover 13 is positioned facing away from the fourth surface 115 of the lower plastic member 11.

The upper cover 13 defines the through hole 130. The deformation member 14 is fixed at the upper cover 13 and extends into and covers the through hole 130. The lower plastic member 11 may define the through hole 110 corresponding to the deformation member 14. The deformation member 14 is configured to deform in response to an increased pressure inside the energy storage apparatus 1. When the energy storage apparatus 1 is in special situations (such as overcharge, over-discharge, or impact), a large amount of gas will be generated inside the energy storage apparatus 1, or when the energy storage apparatus 1 is in general situations (such as undergoing a large number of charging/discharging cycle), gas will also be generated inside the energy storage apparatus 1 and gradually accumulates. When a gas pressure inside the energy storage apparatus 1 exceeds a preset pressure threshold, the gas may impact the deformation member 14 through the through hole 110 defined at the lower plastic member 11. The deformation member 14 can deform under a gas pressure towards a metal conductive block to be in electrical contact with the metal conductive block, and thus an external short circuit occurs between a positive electrode and a negative electrode. A large current generated at the moment of the short circuit causes melting of a contact region between the deformation member 14 and the metal conductive block, and thus fusing and cutting occurs and the cell 40 returns to be in an off-state, thereby preventing the energy storage apparatus 1 from explosion caused by overcharge and effectively protecting the energy storage apparatus 1.

Optionally, the lower plastic member 11 may be made of a material such as plastic through an injection molding process.

Optionally, the lower plastic member 11 may be an integrated structure or a separated structure, which is not limited herein.

The lower plastic member 11 is provided with a grid structure 111 at one side of the lower plastic member 11 where the through hole 110 is defined at the fourth surface (115). The grid structure 111 covers the through holes 110. That is, the grid structure 111 separates the through holes 110 into multiple sub-holes 110*a*. In other words, the through hole 110 is positioned between the deformation member 14 and the grid structure 111. The grid structure 111 is located inside the energy storage apparatus 1. The grid structure 111 is composed of multiple grid strips 1111, and is not solid. The multiple grid strips 1111 can intersect one another to form at least one grid hole 1110. Therefore, the gas can normally enter the through hole 110 through grid holes 1110 of the grid structure 111, so that a function of the deformation member 14 is not affected. Additionally, for each of the grid holes 1110, the grid hole 1110 and part of the through hole 110 facing towards the grid hole 1110 can cooperatively form a sub-hole 110*a*, so that the gas can still enter through the sub-holes 110*a* to impact the deformation member 14. In addition, the multiple grid strips 1111 of the grid structure 111 may be configured to avoid other components such as the tap 30 or the blue film, that are broken in some cases, floating into the through hole 110 below the deformation member 14 to obstruct a gas channel and cause an explosion-proof failure. Therefore, the grid structure 111 can effectively protect the normal use of the function of the deformation member 14.

Optionally, the grid structure 111 and the lower plastic member 11 may be formed integrally or separately. In the case where the grid structure 111 and the lower plastic member 11 are formed integrally, both the grid structure 111 and the lower plastic member 11 are made of plastic. The implementations only schematically illustrate an example that the grid structure 111 and the lower plastic member 11 are formed integrally. Specific structures of the grid structure 111 and the lower plastic member 11 are described in detail in the implementations below.

Furthermore, as for the grid structure 111, the connector 20 may also be disposed at one side of the grid structure 111 facing away from the through hole 110 in the implementations. That is, the connector 20 extends from the first connection portion 201 that is connected to the terminal post 15 to the second connection portion 203 that is disposed at one side of the grid structure 111 facing away from the deformation member 14, and the orthographic projection of the connector 20 on the fourth surface 115 of the lower plastic member 11 covers at least part of the multiple sub-holes 110*a*. The term 'cover' may indicate that the connector 20 may be positioned below the grid structure 111, and the orthographic projection of the connector 20 on the fourth surface 115 of the lower plastic member 11 falls on the fourth surface 115, and also falls into the grid structure 111 disposed at the fourth surface 115 and at least part of the multiple sub-holes 110*a* corresponding to the grid structure 111. When observing the lower plastic member 11 from the bottom to the top, the connector 20 covers at least part of the multiple sub-holes 110*a*, so that only part of the multiple sub-holes 110*a* can be viewed or the multiple sub-holes 110*a* are completely blocked. The term 'cover' recited hereinafter can also be understood in the same way, and is not repeated herein. The connector 20 mainly plays a role of connecting in the energy storage apparatus 1. That is, the terminal post 15 and the tab 30 are connected together indirectly through the connector 20. For example, a positive post 15 may be indirectly connected to the positive-electrode tab 30, and a negative post 15 may be indirectly connected to the negative-electrode tab 30.

Optionally, the material of the connector 20 includes, but is not limited to, metal, such as copper, aluminum, nickel and alloys thereof.

It may be noted that the grid structure 111 mentioned in the background is not part of the prior art. Actually, the disclosure is filed on the same day as several other applications, the grid structure 111 described in the background refers to a structure newly introduced in those other applications filed on the same day. The disclosure builds upon those other applications, introducing further inventions and advancements.

The terminal post 15 has a flange portion 151 and a cylinder portion 152. The cylinder portion 152 of the terminal post 15 extends through the second mounting hole 116 of the lower plastic member 11 and the first mounting hole 133 of the upper cover 13. The fifth surface 1511 of the flange portion 151 of the terminal post 15 is positioned facing towards the fourth surface 115 of the lower plastic member 11. The first connection portion 201 of the connector 20 may be electrically connected to the terminal post 15 by welding or other ways. The second connection portion 203 of the connector 20 may be electrically connected to one end of the tab 30 by welding or other ways. The other end of the tab 30 may be connected to the cell 40. Therefore, the terminal post 15, the connector 20, the tab 30, and the cell 40 are connected with one another, thereby facilitating subsequent current transmission.

Optionally, one side face of the connector 20 close to the lower plastic member 11 is connected to the terminal post 15, and the other side face of the connector 20 facing away from the lower plastic member 11 is connected to the tab 30.

Optionally, the terminal post 15 is farther away from a center of the lower plastic member 11 than the through hole 110. In other words, the through hole 110 is positioned closer to the center than the terminal post 15.

In the above implementations, the connector 20 can be configured to cover the grid structure 111, i.e. a metal component is configured to cover a plastic component, such that the grid structure 111 is effectively protected, and the relatively thin grid strip 1111 of the grid structure 111 is prevented from breaking caused by factors such as shaking or impact during transportation of the energy storage apparatus 1, and thus the stability and service life of the energy storage apparatus 1 are improved. Additionally, the connector 20 can further protect the through hole 110, that is, the connector 20 can prevent the tab 30 that is broken from entering the through hole 110 via the grid structure 111 to be short-circuited with the deformation member 14.

In conclusion, the energy storage apparatus 1 provided in the implementations can not only prevent the energy storage apparatus 1 from exploding, but also effectively protect the grid structure 111, thereby preventing the grid structure 111 from breaking, and improving the stability and service life of the energy storage apparatus 1.

Figure 8:
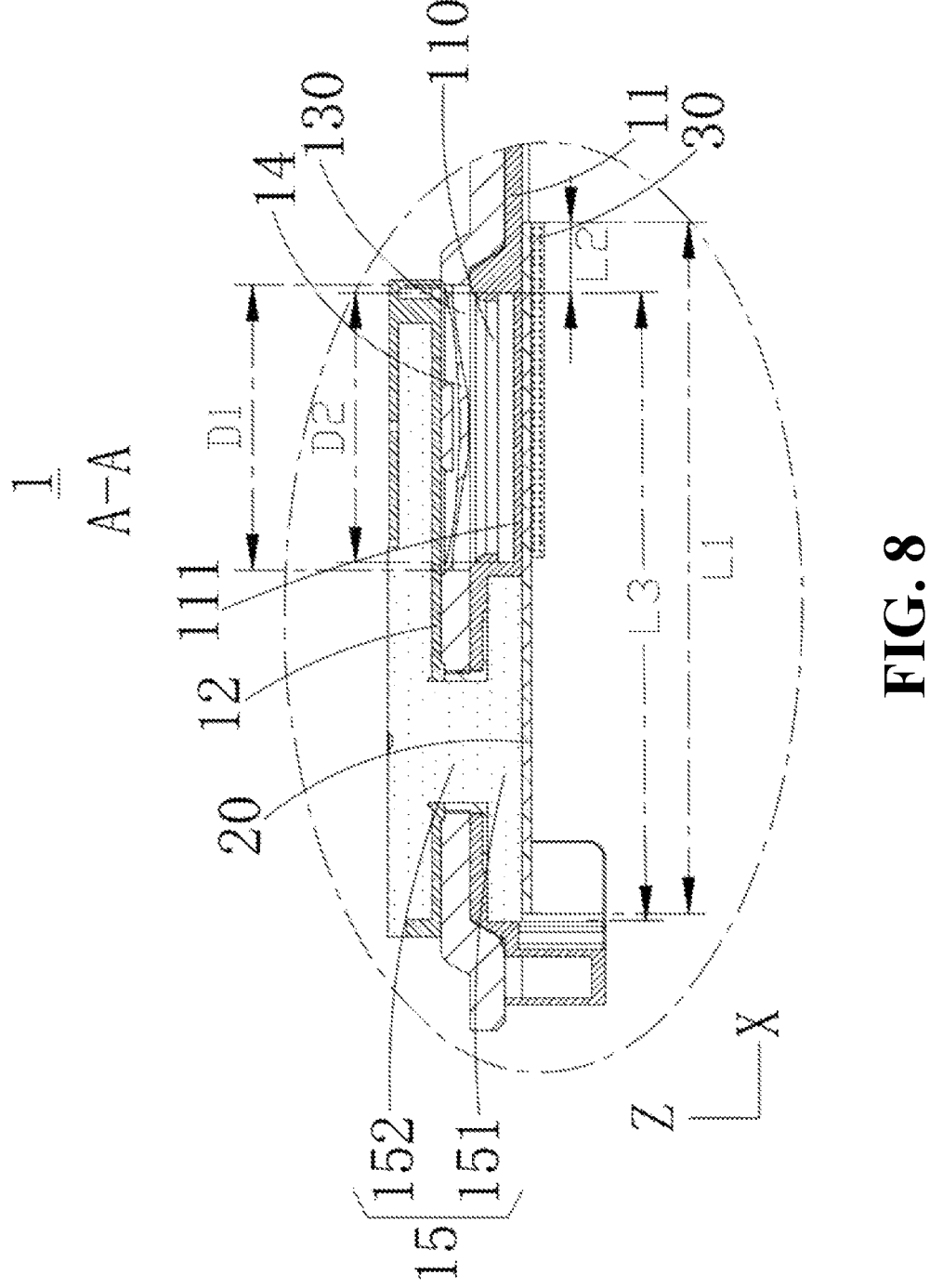
FIG. 8 is a schematic view showing part of the structure in FIG. 5.

As illustrated in FIGS. 4, 6 and 8, FIG. 8 is a schematic view showing part of the structure in FIG. 5. In the implementations, the orthographic projection of the connector 20 on the fourth surface 115 of the lower plastic member 11 covers the multiple sub-holes 110*a* of the grid structure 111 in a length direction X of the lower plastic member 11, and covers an edge of the grid structure 111 facing away from the second mounting hole 116.

It may be noted that each of components such as the connector 20 and the lower plastic member 11 has a three dimensional (3D) structure with a certain size, and thus has a length direction, a width direction, and a thickness direction. The length direction X can serve as an X direction in the drawings, the width direction Y can serve as a Y direction in the drawings, and the thickness direction Z can serve as a Z direction in the drawings. For example, the length direction X of the lower plastic member 11 is the X direction, the length direction X of the connector 20 is also the X direction, and the width direction Y of the connector 20 is the Y direction.

In the implementations, in the length direction X of the lower plastic member 11, the orthographic projection of the connector 20 on the fourth surface 115 of the lower plastic member 11 covers the multiple sub-holes 110a of the grid structure 111, and covers the edge of the grid structure 111 facing away from the second mounting hole 116. Therefore, the connector 20 extends from one side of the grid structure 111 to the other side of the grid structure 111 in the length direction X, and thus the connector 20 may abut against a periphery of the grid structure 111 when being subjected to an external force toward the lower plastic member 11, thereby achieving a full protection for the grid structure 111, further preventing the grid strips 1111 of the grid structure 111 from breaking, and further enhancing the capability of protecting the grid structure 111 of the grid strips 1111. A width of the connector 20 and a width of the grid structure 111 in the width direction Y are not limited herein.

Furthermore, since the connector 20 abuts against the periphery of the grid structure 111, the gas generated in the energy storage apparatus 1 can still enter the grid holes 1110 of the grid structure 111 through a gap between the connector 20 and the grid structure 111, and then enter the through hole 110.

As illustrated in FIG. 8, in the implementations, the orthographic projection of the connector 20 on the fourth surface 115 of the lower plastic member 11 covers the edge (as illustrated by L2 in FIG. 8) of the grid structure 111 facing away from the second mounting hole 116, and the edge has a length of 1 mm-12 mm in the length direction X of the lower plastic member 11.

In the implementations, the length of the edge of the grid structure 111 covered by the connector 20 can be 1 mm-12 mm. In this way, not only can an end of the connector 20 stably overlap the edge of the grid structure 111, but also a fault-tolerant margin can be provided for a position where the connector 20 is welded on the sixth surface 1512 of the flange portion 151, and thus the end of the connector 20 can still overlap the edge of the grid structure 111 even in the case where the connector 20 can be welded with an offset at left or right.

Optionally, the length of the edge of the lower plastic member 11 in the length direction X may be 1 mm, 2 mm, 3 mm, 4 mm, 5 mm, 6 mm, 7 mm, 8 mm, 9 mm, 10 mm, 11 mm, 12 mm, etc.

As illustrated in FIG. 7 and FIG. 8, in the implementations, in the length direction X of the lower plastic member 11, a ratio of a length of the connector 20 (as illustrated by L1 in FIG. 7 and FIG. 8) to a distance (as illustrated by L3 in FIG. 7 and FIG. 8) between one end of the flange portion 151 facing away from the grid structure 111 and one end of the grid structure 111 facing away from the flange portion 151 ranges from 1.02 to 1.5.

In the implementations, the length of the connector 20 is greater than the distance between the end of the flange portion 151 facing away from the grid structure 111 and the end of the grid structure 111 facing away from the flange portion 151, and thus the end of the connector 20 can extend to the edge of the grid structure 111, and the end of the connector 20 can abut against the edge of the grid structure 111 that has a large structural strength when pushing the connector 20 up, thereby achieving buffering, and preventing the grid strip 1111 having a small structural strength from breaking. Furthermore, in the implementations, it is possible to prevent the connector 20 from being excessively long, where an excessive length of the connector 20 may make the connector 20 cross the grid structure 111 of an explosion-proof valve in the middle, resulting in interference to warp the connector 20 up.

Optionally, the ratio of the length of the connector 20 to the distance between the end of the flange portion 151 facing away from the grid structure 111 and the end of the grid structure 111 facing away from the flange portion 151 may be 1.02, 1.05, 1.1, 1.15, 1.2, 1.25, 1.3, 1.35, 1.4, 1.45, 1.5, etc.

In the implementations, the length of the connector 20 is 40 mm-45 mm. Optionally, the length of the connector 20 may be 40 mm, 40.5 mm, 41 mm, 41.5 mm, 42 mm, 42.5 mm, 43 mm, 43.5 mm, 44 mm, 44.5 mm, or 45 mm.

Figure 9:
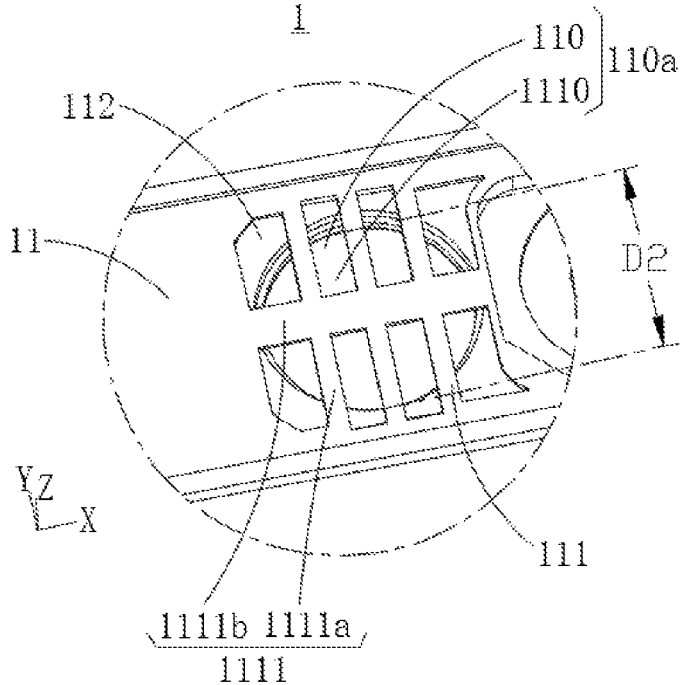
FIG. 9 is a schematic view showing part of the structure in FIG. 7.
Figure 10:
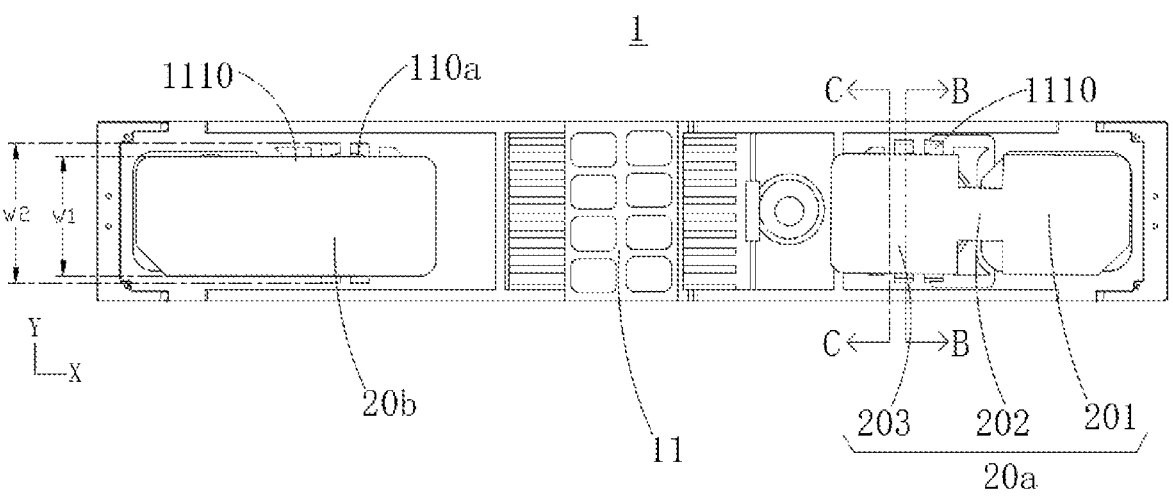
FIG. 10 is a top view of the lower plastic member and the connector illustrated in FIG. 6.
Figure 11:
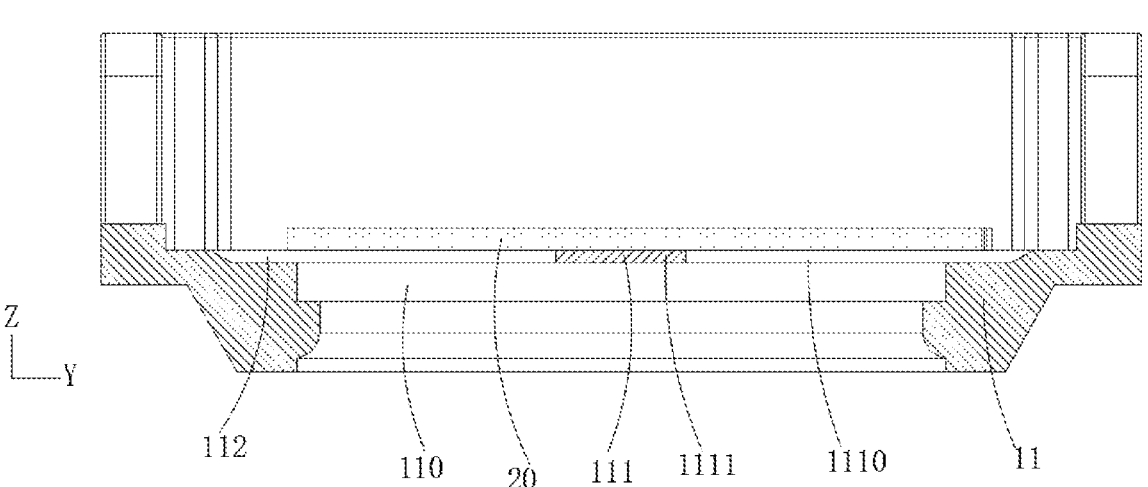
FIG. 11 is a schematic cross-sectional view of the lower plastic member and the connector illustrated in FIG. 10 along line B-B.

As illustrated in FIG. 4 and FIGS. 9 to 11, FIG. 9 is a schematic view showing part of the structure in FIG. 7. FIG. 10 is a top view of the lower plastic member and the connector illustrated in FIG. 6. FIG. 11 is a schematic cross-sectional view of the lower plastic member and the connector illustrated in FIG. 10 along line B-B. In the implementations, a recess 112 is defined on one side face of the lower plastic member 11 facing away from the upper cover 13, the grid structure 111 is disposed in the recess 112, and the through hole 110 penetrates through a bottom wall of the recess 112. The grid structure 111 defines multiple grid holes 1110 arranged at intervals t in the length direction X of the lower plastic member 11. At least part of each of the multiple grid holes 1110 is in communication with the through hole 110. For each of the multiple grid holes 1110, the multiple grid hole 1110 and part of the through hole 110 facing towards the grid hole 1110 cooperatively form one of the multiple sub-holes 110a. In the width direction Y of the lower plastic member 11, the orthographic projection of the connector 20 on the fourth surface 115 of the lower plastic member 11 covers part of the multiple sub-holes 110a.

The recess 112 can be defined on the side face of the lower plastic member 11 facing away from the upper cover 13 (i.e., the fourth surface 115 of the lower plastic member 11), the grid structure 111 is disposed in the recess 112, and the through hole 110 penetrates through the bottom wall of the recess 112. In this way, not only the through hole 110 can communicate with the grid structure 111, but also an overall thickness of the lower plastic member 11 can be reduced. Optionally, in an implementation, the grid structure 111 may be defined at the bottom wall of the recess 112. In another implementation, the grid structure 111 may be defined at a side wall of the recess 112. In other implementations, the grid structure 111 may be defined at both the bottom wall and the side wall of the recess 112. The implementations only schematically illustrate an example that the grid structure 111 is defined at both the bottom wall and the side wall of the recess 112.

The grid structure 111 includes three first grid strips 1111a arranged at intervals in the length direction X of the connector 20, and a second grid strip 1111b connected to the three first grid strips 1111a. Each of the first grid strips 1111a is connected to the bottom wall and the side wall of the recess 112, and the second grid strip 1111b is connected to the bottom wall and the side wall of the recess 112. Four grid holes 1110 can be defined between two adjacent first grid strips 1111a and between the first grid strip 1111a and the side wall of the recess 112. In an implementation, each two adjacent first grid strips 111a, the second grid strip, and the bottom wall of the recess 112 cooperatively define four grid holes 1110. For each of the grid holes 1110, the grid hole 1110 and part of the through hole 110 facing towards the grid holes 1110 cooperatively form one sub-hole 110a. The second grid strip 1111b is configured to fix and strengthen the entire strength of the grid structure 111. Since the bottom wall of the recess 112 is penetrated by the through hole 110, the grid holes 1110 can communicate with the through hole 110, so that the gas first enters the grid holes 1110, and then enters the through hole 110.

In the implementations, in the width direction Y of the lower plastic member 11, the orthographic projection of the connector 20 on the fourth surface 115 of the lower plastic member 11 covers part of the multiple sub-holes 110a. In other words, the connector 20 does not completely cover the grid structure 111 in the width direction Y, part of the grid holes 1110 are positioned protruding out of and not covered by the connector 20, so that the above implementations can be realized where the connector 20 covers part of the grid structure 111. It can also be understood that, the connector 20 completely covers the multiple sub-holes 110a in the length direction X, and the connector 20 only covers part of the multiple sub-holes 110a in the width direction Y. In this way, when a large amount of gas is generated in the energy storage apparatus 1, the gas can enter the through hole 110 through part of the grid holes 1110 that is not covered by the adapter 20, and thus there is a channel provided for the gas, preventing the grid holes 1110 from being completely covered by the adapter 20, and accordingly avoiding formation of an enclosed isolation space below the deformation member 14 which may make the deformation member 14 fail.

Optionally, two middle grid holes 1110 of the four grid holes 1110 are positioned protruding out of the connector 20. Further optionally, all the four grid holes 1110 are positioned protruding out of the connector 20.

As illustrated in FIG. 10 and FIG. 11, in the implementations, in the width direction Y of the lower plastic member 11, the orthographic projection of the connector 20 on the fourth surface 115 of the lower plastic member 11 covers part of the multiple grid holes 1110. In the length direction X of the connector 20, two ends of the grid hole 1110 away from the connector 20 are not covered by the orthographic projection.

In the implementations, the connector 20 may not cover the two opposite ends of the grid hole 1110, the two opposite ends of the grid hole 1110 are positioned protruding out of the connector 20, and thus the two ends of the grid hole 1110 in the direction X away from the connector 20 are not covered. In other words, the two opposite ends of the grid hole 1110 are not covered by the connector 20, the gas in the energy storage apparatus 1 can enter the through hole 110 via any of the two ends, and thus an intake effect of the gas is further improved.

As illustrated in FIG. 10, in the implementations, in the width direction Y of the lower plastic member 11, a ratio of a width (as illustrated by W2 in FIG. 10) of the grid structure 111 to a width (as illustrated by W1 in FIG. 10) of the connector 20 ranges from 1.01 to 1.4, that is, the ratio of W2 to W1 ranges from 1.01 to 1.4.

In the implementations, the width of the grid structure 111 is less than the width of the connector 20, so that not only a sufficiently large region of the sub-holes 110a remains uncovered for passage of gas, but also a sufficiently large region of the grid holes 1110 can be covered by the connector 20 to prevent the relatively thin grid strip 1111 from breaking and improve the structural stability.

Optionally, the ratio of the width of the grid structure 111 to the width of the connector 20 may be 1.01, 1.05, 1.1, 1.15, 1.2, 1.25, 1.3, 1.35, 1.4, 1.45, 1.5, etc.

In the implementations, the width of the connector 20 is in the range from 15 mm to 20 mm. Optionally, the width of the connector 20 may be 15 mm, 15.5 mm, 16 mm, 16.5 mm, 17 mm, 17.5 mm, 18 mm, 18.5 mm, 19 mm, 19.5 mm, or 20 mm.

In the implementations, the width of the grid hole 1110 is in the range from 13 mm to 18 mm. Optionally, the width of the grid hole 1110 may be 13 mm, 13.5 mm, 14 mm, 14.5 mm, 15 mm, 15.5 mm, 16 mm, 16.5 mm, 17 mm, 17.5 mm, or 18 mm.

As illustrated in FIGS. 8 and 9, in the implementations, in the width direction Y of the lower plastic member 11, a ratio of a diameter of the through hole 110 (as illustrated by D2 in FIGS. 8 and 9) to a diameter of the deformation member 14 (as illustrated by D1 in FIG. 8) ranges from 0.4 to 1.2, that is, the ratio of D2 to D1 ranges from 0.4 to 1.2.

In the implementations, the ratio of the diameter of the through hole 110 to the diameter of the deformation member 14 can be set to be 0.4 to 1.2, thereby preventing the through hole 110 from being too small, ensuring that the gas can impact the deformation member 14 to make the deformation member 14 flip outwards or bend outwards, and also preventing an excessive size of the lower plastic member 11 due to an excessive size of the through hole 110, where an excessive size of the through hole 110 may cause an increase in an overall size of the energy storage apparatus 1.

Optionally, the ratio of the diameter of the through hole 110 to the diameter of the deformation member 14 may be 0.4, 0.5, 0.6, 0.7, 0.8, 0.9, 1.0, 1.1, 1.2, etc.

As illustrated in FIG. 9, in the implementations, the diameter of the through hole 110 is in the range from 13 mm to 18 mm. Optionally, the diameter of the through hole 110 may be 13 mm, 13.5 mm, 14 mm, 14.5 mm, 15 mm, 15.5 mm, 16 mm, 16.5 mm, 17 mm, 17.5 mm, or 18 mm.

As illustrated in FIG. 10, in the implementations, the connector 20 includes a positive-electrode connector 20a. The positive-electrode connector 20a includes the first connection portion 201, a fuse portion 202, and the second connection portion 203. The fuse portion 202 is disposed between the first connection portion 201 and the second connection portion 203. In the width direction Y of the positive-electrode connector 20a, a width of the fuse portion 202 is less than a width of the first connection portion 201, and the width of the fuse portion 202 is less than a width of the second connection portion 203.

The connector 20 may include the positive-electrode connector 20a and a negative-electrode connector 20b. The positive-electrode connector 20a may include three parts, i.e., the first connection portion 201, the fuse portion 202, and the second connection portion 203. The first connection portion 201 is configured to connect to the terminal post 15, and it can be understood that one end of the positive-electrode connector 20a is disposed at the first connection portion 201. The second connection portion 203 is configured to connect to the tab 30, and it can be understood that the other end of the positive-electrode connector 20a is disposed at the second connection portion 203. The fuse portion 202 is located between the first connection portion 201 and the second connection portion 203. When the positive-electrode connector 20a has a uniform thickness, in the implementations, the width of the fuse portion 202 is less than the width of the first connection portion 201 and the width of the second connection portion 203 in the width direction Y of the positive-electrode connector 20a. That is, the fuse portion 202 is narrower than the first connection portion 201 and the second connection portion 203, and it can also be understood that the positive-electrode connector 20a has a narrowed portion at the middle region.

By narrowing the fuse portion 202, a cross-sectional area of the middle region of the positive-electrode connector 20a can be reduced, a cross-sectional area of the fuse portion 202 is smaller than each of a cross-sectional area of the first connection portion 201 and a cross-sectional area of the second connection portion 203, and thus a resistance of the middle region is increased. When the energy storage apparatus 1 is overloaded, over-charged or in other special situations, a large current will pass through the positive-electrode connector 20a, the fuse portion 202 with a large resistance will generate more heat than the first connection portion 201 and the second connection portion 203 and is easier to fuse, thereby effectively protecting the energy storage apparatus 1.

As illustrated in FIG. 7, in the implementations, in the width direction Y of the positive-electrode connector 20a, the width of the fuse portion 202 is W3 (as illustrated by W3 in FIG. 7), and both the width of the first connection portion 201 and the width of the second connection portion 203 are W4 (as illustrated by W4 in FIG. 7), and a ratio of W3 to W4 ranges from 0.15 to 0.65.

In the implementations, the ratio of the width of the fuse portion 202 to the width of the first connection portion 201 or the width of the second connection portion 203 is set to be 0.15-0.65, thereby preventing the fuse portion 202 from being excessively narrow, where an excessively narrow fuse portion 202 is prone to break, which may cause a failure of the energy storage apparatus 1. In addition, it can also avoid the fuse portion 202 from being excessively wide, where the cross-sectional area of an excessively wide fuse portion 202 is too large, and thus the resistance of the fuse portion 202 is relatively small, resulting in a large current during fuse, and a failure in protecting the energy storage apparatus 1.

Optionally, the ratio of the width of the fuse portion 202 to the width of the first connection portion 201 or to the width of the second connection portion 203 may be 0.15, 0.2, 0.25, 0.3, 0.35, 0.4, 0.45, 0.5, 0.55, 0.6, 0.65, etc.

As illustrated in FIG. 10, in the implementations, the fuse portion 202 is positioned at least partially facing towards the grid holes 1110 after assembly.

It can be seen from the above that the positive-electrode connector 20a can cover the grid holes 1110 of the grid structure 111. In the implementations, during subsequent assembly, the fuse portion 202 is positioned at least partially facing towards the grid holes 1110 after the positive-electrode connector 20a is assembled at the lower plastic member 11. Since the fuse portion 202 has a less width, the fuse portion 202 covers a smaller part of the grid holes 1110 than the second connection portion 203, that is, a relatively small region of the grid holes 1110 is covered, allowing more grid holes 1110 to be not completely covered, and further improving an intake effect of the gas.

As illustrated in FIG. 11, in the implementations, a wall of the two ends of the grid hole 1110 that are not covered is oblique, and for each of the multiple grid holes 1110, a size of the grid hole 1110 close to the through hole 110 is smaller than a size of the grid hole 1110 away from the through hole 110.

For the grid holes 1110 that are positioned protruding out of the connector 20, the wall of each of the grid holes 1110 that is positioned protruding out of the connector 20 is further oblique in the implementations. The term "oblique" indicates that the wall of each of the grid holes 1110 that are positioned protruding out of the connector 20 is angled at an obtuse angle relative to the bottom wall of the recess 112. Therefore, for each of the multiple grid holes 1110, the size of the grid hole 1110 close to the through hole 110 is smaller than the size of the grid hole 1110 away from the through hole 110. That is, the grid hole 1110 forms a structure with a large top and a small bottom. In this way, it can facilitate a directing for gas-flow, and avoid any potential collision of gases when entering the grid holes 1110. Whether the wall of each of the grid holes 1110 that are covered by the connector 20 is oblique is not limited in the implementations.

Optionally, in an implementation, two walls of each grid hole 1110 opposite each other in the width direction Y of the connector 20 are oblique. In another implementation, two walls of each grid hole 1110 opposite each other in the length direction X of the connector 20 are oblique. In other implementations, the two walls of the grid holes 1110 opposite each other in the width direction Y of the connector 20 are oblique, and the two walls of the grid holes 1110 opposite each other in the length direction X of the connector 20 are also oblique. In the implementations, exemplarily, only the two walls of the grid holes 1110 opposite each other in the width direction Y of the connector 20 are oblique.

As illustrated in FIG. 11, in the implementations, a surface of the grid structure 111 facing away from the through hole 110 is flush with an upper surface of the lower plastic member 11 where the recess 112 is defined. In this way, surface flatness of the lower plastic member 11 can be improved, and difficulty in processing and molding can be reduced.

Figure 12:
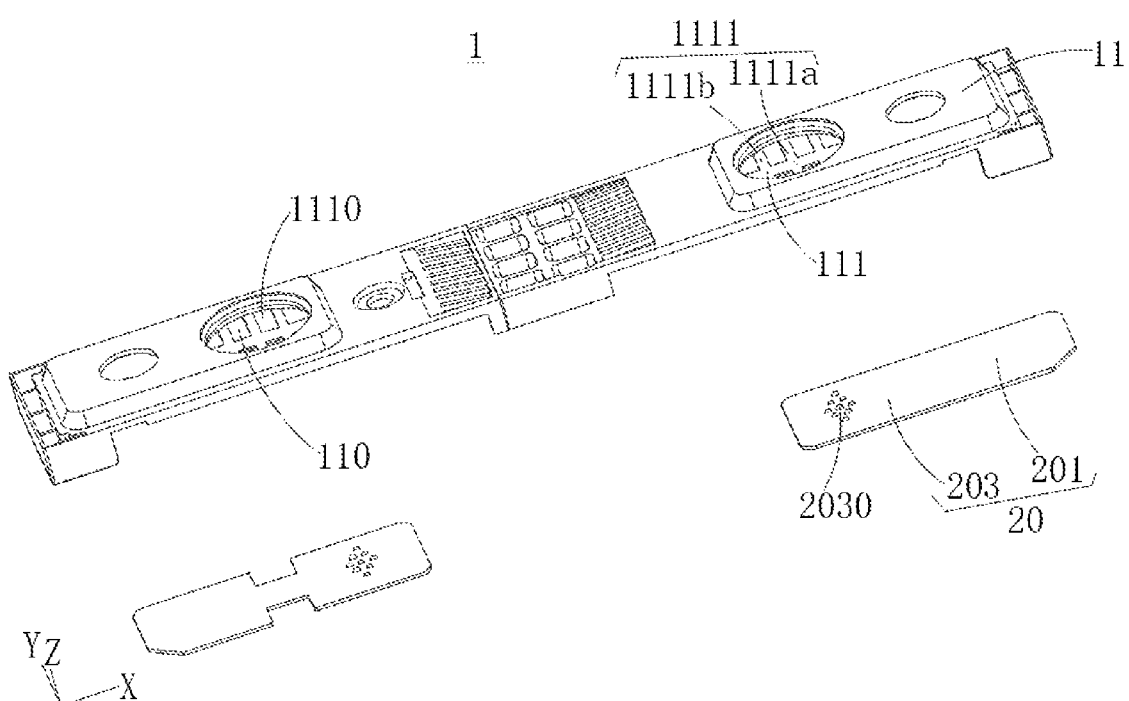
FIG. 12 is an exploded view of the lower plastic member and the connector illustrated in FIG. 6 from another viewing angle.
Figure 13:
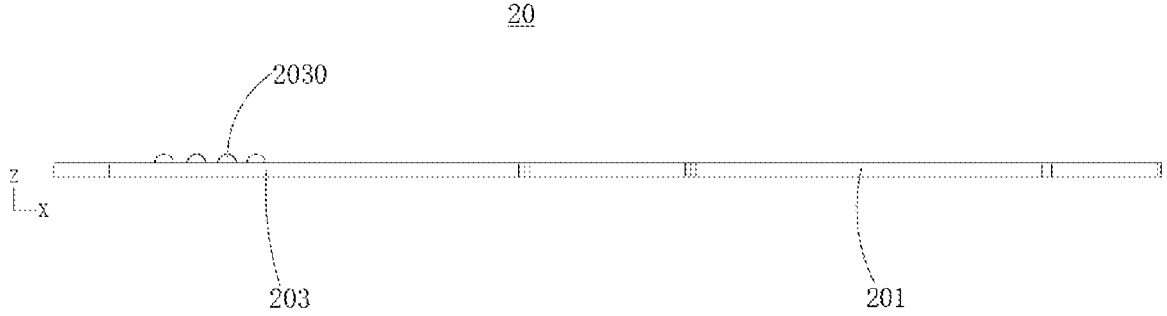
FIG. 13 is a side view of a connector in an implementation of the disclosure.
Figure 14:
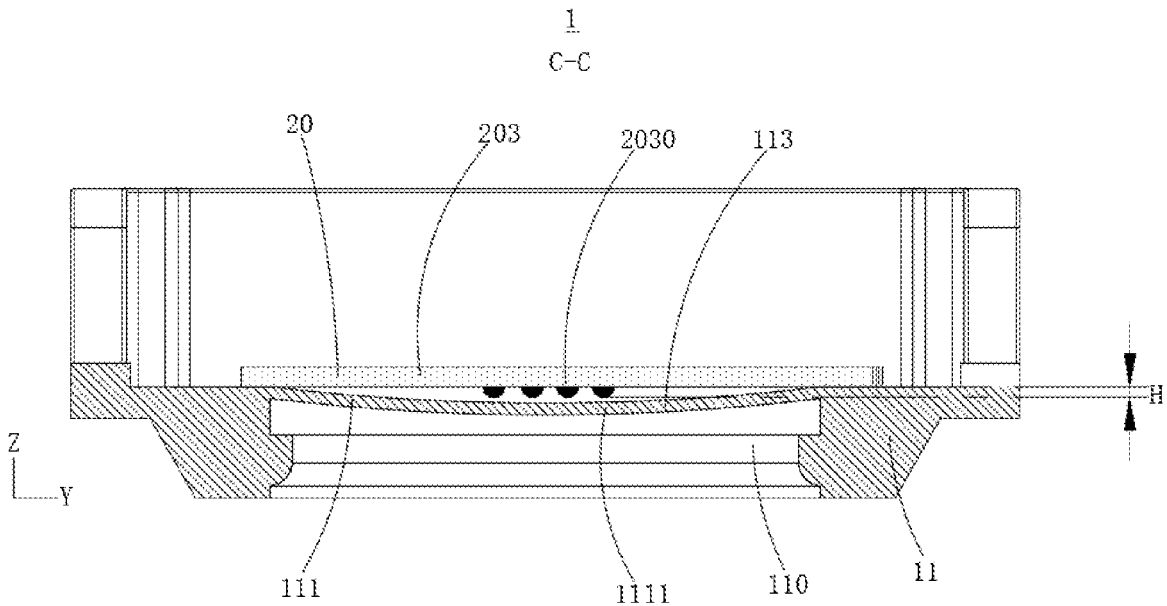
FIG. 14 is a schematic cross-sectional view of the lower plastic member and the connector illustrated in FIG. 10 alone line C-C.

As illustrated in FIGS. 12 to 14, FIG. 12 is an exploded view of the lower plastic member and the connector illustrated in FIG. 6 from another viewing angle. FIG. 13 is a side view of a connector in an implementation of the disclosure. FIG. 14 is a schematic cross-sectional view of the lower plastic member and the connector illustrated in FIG. 10 along line C-C. In the implementations, the connector 20 includes the first connection portion 201 and the second connection portion 203. The second connection portion 203 is provided with a protrusion 2030 on one side face of the second connection portion 203 facing towards the grid structure 111, the grid structure 111 is provided with an avoiding portion 113, and the protrusion 2030 matches the avoiding portion 113 after assembly.

The connector 20 may include the first connection portion 201 and the second connection portion 203. The first connection portion 201 is configured to connect to the terminal post 15, and thus one end of the connector 20 can be understood as being disposed at the first connection portion 201. The second connection portion 203 is configured to connect to the tab 30, and thus the other end of the connector 20 may be understood as being disposed at the second connection portion 203. Specifically, the tab 30 may be welded on a surface of the second connection portion 203 facing away from the lower plastic member 11, and an upper pressing head and a lower pressing head cooperatively press to form the protrusion 2030 when ultrasonically welding the second connection portion 203 with the tab 30.

Therefore, in the implementations, the grid structure 111 is provided with the avoiding portion 113, the protrusions 2030 matches the avoiding portion 113, and the avoiding portion 113 is configured to receive the protrusion 2030, so that the connector 20 can be attached to the lower plastic member 11 more tightly, and the overall thickness can be reduced. Specifically, the avoiding portion 113 may form a receiving space, and the protrusion 2030 is received in the receiving space. It may be noted that, in the implementations, the connector 20 may be the positive-electrode connector 20a or the negative-electrode connector 20b.

Optionally, a height (as illustrated by H in FIG. 14) of the protrusion 2030 ranges from 0.05 mm to 2 mm. Optionally, the height of the protrusion 2030 may be 0.05 mm, 0.1 mm, 0.3 mm, 0.5 mm, 0.7 mm, 0.8 mm, 0.9 mm, 1.0 mm, 1.1 mm, 1.3 mm, 1.5 mm, 1.7 mm, 1.8 mm, 2.0 mm, etc.

As illustrated in FIG. 14, in the implementations, a surface of one side of the grid structure 111 close to the connector 20 is bent in a direction away from the connector 20 to form the avoiding portion 113.

In an implementation, the grid strip 1111 of the grid structure 111 can be bent in the direction away from the connector 20, so that the surface of the grid strip 1111 close to the connector 20 can be bent in the direction away from the connector 20 to form the avoiding portion 113, and thus the difficulty in manufacturing the grid structure 111 can be reduced. Since the other surface of the grid strip 1111 corresponds to the through hole 110, the other surface of the grid strip 1111 protrudes towards the through hole 110 or even enters the through hole 110 without affecting normal use of the deformation member 14.

In another implementation, the grid strip 1111 of the grid structure 111 may be not bent, but the grid strip 1111 defines a recess on the surface close to the connector 20, to form the avoiding portion 113.

An electric device is further provided in the implementations. The electric device includes the energy storage apparatus 1 provided in the foregoing implementations of the disclosure. The energy storage apparatus 1 is configured to power the electric device.

The electric device provided in implementations of the disclosure may be used for vehicles or electric storage stations, etc. For example, the electric device is a vehicle. The vehicle may be a gasoline vehicle, a gas vehicle, or a new energy vehicle. The new energy vehicle may be a pure electric vehicle, a hybrid vehicle, or a range-extended vehicle. A vehicle includes a battery, a controller, and a motor. The battery is configured to power the controller and the motor to be used as an operating power and a driving power of the vehicle, and for example, the battery is configured for working electricity requirements during starting, navigation, and operation of the vehicle. For example, the battery powers the controller, the controller controls the battery to power the motor, and the motor receives and uses the power of the battery as a driving power of the vehicle to provide driving power for the vehicle instead of or partly replacing gasoline or natural gas. The energy storage apparatus 1 provided in the foregoing implementations of the disclosure can not only be prevented from exploding, but also can be prevented from explosion-proof failure, and the stability and service life of the electric device can be improved.

The reference herein to "example" or "implementation" means that specific features, structures, or characteristics described in conjunction with example or implementations may be included in at least one implementation of the disclosure. The phrase appearing in various positions in the specification does not necessarily refer to the same implementation, nor is it an independent or alternative example mutually exclusive with other implementations. Those skilled in the art explicitly and implicitly understand that implementations described herein can be combined with other implementations.

It may be noted that terms "first", "second", or the like used in the specification, the claims, and the accompany drawings of the disclosure are used to distinguish different objects rather than describe a specific order. In addition, terms "comprise" and "have" as well as variations thereof are intended to cover non-exclusive inclusion.

In the disclosure, for convenience, terms such as "middle", "upper", "lower", "front", "rear", "vertical", "horizontal", "top", "bottom", "inner", "outer", or the like, which indicate orientation or positional relationship, are used to describe positional relationships among the components with reference to the drawings. The terms are only for convenience in describing the disclosure and simplifying the illustration, rather than indicating or implying that the device or element must have a specific orientation, be constructed and operated in a specific orientation, and therefore, the terms cannot be understood as a limitation on the disclosure. The positional relationship of the components can be appropriately changed in accordance with the direction of the described components, and thus the terms can be appropriately replaced depending on the situation, which is not limited in the disclosure as described.

In the disclosure, it may be noted that, unless stated otherwise, terms "mount", "couple", and "connect" referred to herein may be understood in a broad sense. For example, they may include a fixed connection, a removable connection, or an integrated connection, may include a mechanical connection or an electrical connection, may include a direct connection, an indirect connection through a medium, or an interconnection between two components. For those skilled people in the art, the above terms in the present disclosure can be understood according to specific situations.

Implementations of the disclosure are described in detail in the above. Principles and implementations of the disclosure are elaborated herein. The illustration above is only used to help understanding of methods and core ideas of the disclosure. Additionally, for those skilled people in the art, according to ideas of the disclosure, there may be changes in a specific implementation and the application scope. In summary, this specification may not be understood as limitation on the disclosure.

What is claimed is:

1. An energy storage apparatus, comprising an upper cover, a deformation member, a lower plastic member, a terminal post, a connector, and a tab, wherein:

the upper cover has a first surface and a second surface in a thickness direction, and defines a through hole and a first mounting hole that penetrate through the first surface and the second surface;

the deformation member is fixed at the upper cover and extends into and covers the through hole of the upper cover, and is configured to deform in response to an increased pressure inside the energy storage apparatus;

the lower plastic member has a third surface and a fourth surface in the thickness direction, and defines a through hole and a second mounting hole that penetrate through the third surface and the fourth surface, the lower plastic member is provided with a grid structure at one side of the lower plastic member where the through hole of the lower plastic member is defined at the fourth surface, and the grid structure separates the through hole of the lower plastic member into a plurality of sub-holes;

a recess is defined on one side face of the lower plastic member facing away from the upper cover, the grid structure is disposed in the recess, and the through hole of the lower plastic member penetrates through a bottom wall of the recess, the grid structure defines a plurality of grid holes arranged at intervals in a length direction of the lower plastic member, at least part of each of the plurality of grid holes is in communication with the through hole of the lower plastic member, and each of the plurality of grid holes and the through hole of the lower plastic member cooperatively form one of the plurality of sub-holes; wherein in a width direction of the lower plastic member, an orthographic projection of the connector on the fourth surface of the lower plastic member covers part of the plurality of sub-holes;

in a width direction of the lower plastic member, a width of the grid structure is W2, a width of the connector is W1, and a ratio of W2 to W1 ranges from 1.01 to 1.4, wherein part of grid structure is not covered by the connector;

the terminal post has a flange portion and a cylinder portion, wherein the flange portion has a fifth surface and a sixth surface, and the cylinder portion is disposed at one side of the flange portion where the fifth surface is located;

the cylinder portion of the terminal post extends through the second mounting hole of the lower plastic member and the first mounting hole of the upper cover, the fifth surface of the flange portion is positioned facing towards the fourth surface of the lower plastic member, the third surface of the lower plastic member is positioned facing towards the second surface of the upper cover, and the through hole of the lower plastic member is positioned facing towards the through hole of the upper cover;

the connector has a first connection portion and a second connection portion at two opposite ends of the connector, wherein the first connection portion is connected to the sixth surface of the flange portion, the second connection portion is connected to the tab, and the second connection portion is positioned facing towards the grid structure;

the connector extends from the first connection portion that is connected to the terminal post to the second connection portion that is disposed at one side of the grid structure facing away from the deformation member;

the second connection portion is provided with a protrusion on one side face of the second connection portion facing towards the grid structure, the grid structure is provided with an avoiding portion, and the protrusion matches the avoiding portion after assembly;

a surface of the grid structure close to the connector is bent in a direction away from the connector to form the avoiding portion; and the avoiding portion defines a receiving space, and the protrusion is received within the receiving space.

2. The energy storage apparatus of claim 1, wherein the orthographic projection of the connector on the fourth surface of the lower plastic member covers the plurality of sub-holes of the grid structure in a length direction of the lower plastic member, and covers an edge of the grid structure facing away from the second mounting hole.

3. The energy storage apparatus of claim 2, wherein the orthographic projection of the connector on the fourth surface of the lower plastic member covers the edge of the grid structure facing away from the second mounting hole, and the edge has a length of 1 mm-12 mm in the length direction of the lower plastic member.

4. The energy storage apparatus of claim 2, wherein in the length direction of the lower plastic member, a ratio of a length of the connector to a distance between one end of the flange portion facing away from the grid structure and one end of the grid structure facing away from the flange portion ranges from 1.02 to 1.5.

5. The energy storage apparatus of claim 1, wherein in the width direction of the lower plastic member, a diameter of the through hole is D2, and a diameter of the deformation member is D1, wherein $0.4 \leq D2/D1 \leq 1.2$.

6. The energy storage apparatus of claim 1, wherein
the connector comprises a positive-electrode connector, wherein the positive-electrode connector comprises the first connection portion, a fuse portion, and the second connection portion, and wherein the fuse portion is disposed between the first connection portion and the second connection portion; and
in the width direction of the positive-electrode connector, a width of the fuse portion is less than a width of the first connection portion, and the width of the fuse portion is less than a width of the second connection portion.

7. The energy storage apparatus of claim 6, wherein in the width direction of the positive-electrode connector, the width of the fuse portion is W3, and both the width of the first connection portion and the width of the second connection portion are W4, wherein $0.15 \leq W3/W4 \leq 0.65$.

8. The energy storage apparatus of claim 6, wherein the fuse portion is positioned at least partially facing towards the grid holes after assembly.

9. An electric device, comprising an energy storage apparatus, wherein the energy storage apparatus is configured to power the electric device, and comprises an upper cover, a deformation member, a lower plastic member, a terminal post, a connector, and a tab, wherein
the upper cover has a first surface and a second surface in a thickness direction, and defines a through hole and a first mounting hole that penetrate through the first surface and the second surface;
the deformation member is fixed at the upper cover and extends into and covers the through hole of the upper cover, and is configured to deform in response to an increased pressure inside the energy storage apparatus;
the lower plastic member has a third surface and a fourth surface in the thickness direction, and defines a through hole and a second mounting hole that penetrate through the third surface and the fourth surface, the lower plastic member is provided with a grid structure at one side of the lower plastic member where the through hole of the lower plastic member is defined at the fourth surface, and the grid structure separates the through hole of the lower plastic member into a plurality of sub-holes;
a recess is defined on one side face of the lower plastic member facing away from the upper cover, the grid structure is disposed in the recess, and the through hole of the lower plastic member penetrates through a bottom wall of the recess, the grid structure defines a plurality of grid holes arranged at intervals in a length direction of the lower plastic member, at least part of each of the plurality of grid holes is in communication with the through hole of the lower plastic member, and each of the plurality of grid holes and the through hole of the lower plastic member cooperatively form one of the plurality of sub-holes; wherein in a width direction of the lower plastic member, an orthographic projection of the connector on the fourth surface of the lower plastic member covers part of the plurality of sub-holes;

in a width direction of the lower plastic member, a width of the grid structure is W2, a width of the connector is W1, and a ratio of W2 to W1 ranges from 1.01 to 1.4, wherein part of grid structure is not covered by the connector;

the terminal post has a flange portion and a cylinder portion, wherein the flange portion has a fifth surface and a sixth surface, and the cylinder portion is disposed at one side of the flange portion where the fifth surface is located;

the cylinder portion of the terminal post extends through the second mounting hole of the lower plastic member and the first mounting hole of the upper cover, the fifth surface of the flange portion is positioned facing towards the fourth surface of the lower plastic member, the third surface of the lower plastic member is positioned facing towards the second surface of the upper cover, and the through hole of the lower plastic member is positioned facing towards the through hole of the upper cover;

the connector has a first connection portion and a second connection portion at two opposite ends of the connector, wherein the first connection portion is connected to the sixth surface of the flange portion, the second connection portion is connected to the tab, and the second connection portion is positioned facing towards the grid structure;

the connector extends from the first connection portion that is connected to the terminal post to the second connection portion that is disposed at one side of the grid structure facing away from the deformation member;

the second connection portion is provided with a protrusion on one side face of the second connection portion facing towards the grid structure, the grid structure is provided with an avoiding portion, and the protrusion matches the avoiding portion after assembly;

a surface of the grid structure close to the connector is bent in a direction away from the connector to form the avoiding portion; and the avoiding portion defines a receiving space, and the protrusion is received within the receiving space.

10. The electric device of claim 9, wherein the orthographic projection of the connector on the fourth surface of the lower plastic member covers the plurality of sub-holes of the grid structure in a length direction of the lower plastic member, and covers an edge of the grid structure facing away from the second mounting hole.

11. The electric device of claim 10, wherein the orthographic projection of the connector on the fourth surface of the lower plastic member covers the edge of the grid structure facing away from the second mounting hole, and the edge has a length of 1 mm-12 mm in the length direction of the lower plastic member.

12. The electric device of claim 10, wherein in the length direction of the lower plastic member, a ratio of a length of the connector to a distance between one end of the flange portion facing away from the grid structure and one end of the grid structure facing away from the flange portion ranges from 1.02 to 1.5.

13. The electric device of claim 9, wherein in the width direction of the lower plastic member, the orthographic projection of the connector on the fourth surface of the lower plastic member covers part of the plurality of grid holes, and in the length direction of the connector, two ends of the grid hole away from the connector are not covered by the orthographic projection.

14. The electric device of claim 13, wherein a wall of the two ends of the grid hole that are not covered is oblique, and for each of the plurality of grid holes, a size of the grid hole close to the through hole is smaller than a size of the grid hole away from the through hole.

15. The electric device of claim 9, wherein in the width direction of the lower plastic member, a diameter of the through hole is D2, and a diameter of the deformation member is D1, wherein $0.4 \leq D2/D1 \leq 1.2$.

* * * * *